United States Patent [19]

Worley et al.

[11] 4,198,210

[45] Apr. 15, 1980

[54] GAS DISTRIBUTOR FOR FLUIDIZED BED COAL GASIFIER

[75] Inventors: Arthur C. Worley, Mt. Tabor, N.J.; James A. Zboray, Irvine, Calif.

[73] Assignee: Exxon Research & Engineering Co., Florham Park, N.J.

[21] Appl. No.: 14,698

[22] Filed: Feb. 23, 1979

[51] Int. Cl.² ............................................... C10J 3/56
[52] U.S. Cl. .............................. 48/77; 34/57 A; 222/195; 239/591; 422/143
[58] Field of Search .................... 48/62 R, 73, 77; 422/139, 143; 201/31; 34/57 A; 222/195; 239/397.5, 591, 601

[56] References Cited

U.S. PATENT DOCUMENTS

| | | | |
|---|---|---|---|
| 3,370,361 | 2/1968 | Guerrieu | 34/57 A |
| 3,831,857 | 8/1974 | Scott | 239/591 |
| 3,974,091 | 8/1976 | Parker et al. | 34/57 A |
| 4,062,656 | 12/1977 | Blaser et al. | 34/57 A |

*Primary Examiner*—S. Leon Bashore
*Assistant Examiner*—Peter F. Kratz
*Attorney, Agent, or Firm*—F. Donald Paris

[57] ABSTRACT

A gas distributor for distributing high temperature reaction gases to a fluidized bed of coal particles in a coal gasification process. The distributor includes a pipe with a refractory reinforced lining and a plurality of openings in the lining through which gas is fed into the bed. These feed openings have an expanding tapered shape in the downstream or exhaust direction which aids in reducing the velocity of the gas jets as they enter the bed.

3 Claims, 3 Drawing Figures

4,198,210

GAS DISTRIBUTOR FOR FLUIDIZED BED COAL GASIFIER

The Government of the United States of America has rights in this invention pursuant to Contract No. E(49-18)-2480 awarded by the United States Energy Research and Development Administration.

BACKGROUND OF THE INVENTION

The present invention relates to gasification and other processes which require distribution of relatively high (e.g. to 2000° F.) temperature reacting and fluidizing gases into cooler fluidized beds and more particularly, to a coal gasification process wherein the fluidized bed comprises coal particles.

Typically in gasification processes and more specifically coal gasification, a high temperature gas distributor is required for distributing the fluidizing and reaction gases to the fluid bed of coal particles. It is important in these processes for the fluidizing gases entering the bed to have a relatively high pressure drop in order to achieve good distribution to and fluidization of the bed. Standard distributors have employed grid gas distribution arrangements having caps which are directly exposed to high temperature gases and associated corrosion. Other distributors have included the use of a uniform diameter opening which causes the fluidizing gas to enter the bed at such a high velocity to obtain the necessary pressure drop that attrition of the coal particles in the bed takes place.

Other prior art includes the gas discharge nozzle illustrated in U.S. Pat. No. 3,974,091 wherein the gas discharge nozzle for the distributor comprises a stepped cylindrical configuration for an unlined gas outlet opening. This design typifies the prior art which cannot withstand the high inlet gas tempertures and high pressure drops which are encountered in certain processes.

SUMMARY OF THE INVENTION

According to the present invention, there is provided an improved gas distributor, preferably, but not limited for use in a coal gasification process, which includes a refractory metal fiber reinforced lining and tapered gas discharge nozzles provided in the refractory, preferably on the underside of the distributor pipe, for distributing the fluidizing and reaction gases to the fluid bed of coal particles when used in a coal gasification process. The internal lining of the pipe distributor is cast in place. The refractory lining protects the metal from the high temperature gases passing therethrough, the metal being cooled by the fluidized bed surrounding it. Erosion resistant wire reinforced castable refractory is used as the lining material. This lining protects the metal portions of the distributor from weakening and corrosion by the high temperature reaction and fluidizing gases. The pressure drop taken at the gas discharge nozzles provides good fluidization of the bed, which is accomplished by configuring the discharge nozzles with tapered holes expanding in the downstream or outlet direction. This reduces velocity of the gas jets as they enter the bed and thus prevents severe attrition of the coal particles in the fluidized bed.

DESCRIPTION OF THE PREFERRED EMBODIMENTS

Figure 1:
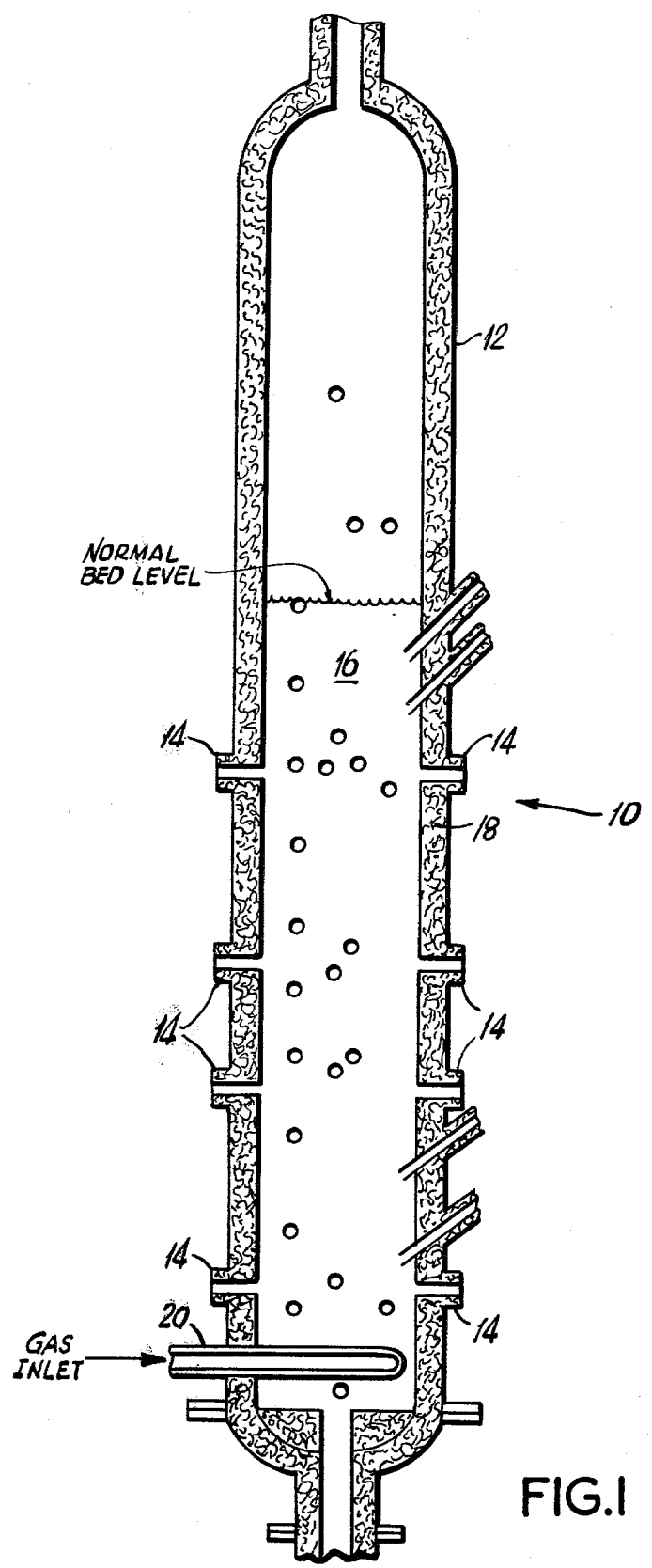
FIG. 1 illustrates an overall view of a typical gasifier for use in a coal gasification process, including a gas distributor constructed in accordance with the present invention.

Referring now to the drawings wherein like parts are designated by the same reference numerals throughout the several views, there is shown in FIG. 1 a standard gasifier 10 for use in a coal gasification process. Typically, the gasifier includes an outer shell 12 and may contain a plurality of feed inlets 14 through which the coal particles are fed into the gasifier in order to form the fluid bed 16, which extends upwardly from the distributor 20 to the line designating the normal bed level. The gasifier is lined internally with a wire reinforced castable refractory 18 and at the bottom end immersed in the bed is a pair of gas inlets comprising gas distributors 20, which are identical in construction. Gas is fed through these distributors into the fluid bed of coal particles. It should be recognized that while the preferred embodiment is disclosed in conjunction with a coal gasification process which involved high temperature reacting gases on the order of 1500° F. or more and which also requires relatively high pressure drops for good distribution of the gases into the relatively tall beds which are 10 to 125 feet in bed depth, the distributor according to this invention also has applicability and use in other gasification processes such as Flexicoking and Fluid Coking wherein similar characteristics are required. In larger scale units the distributor may comprise circular rings instead of parallel pipes as shown.

Each of the distributors 20 comprise a pipe 22 which is lined internally with cast-in-place, erosion-resistant wire reinforced castable material 24 which protects the metal pipe from the high temperature gases that pass therethrough. The pipe would be welded as shown at 21 to the steel shell 12. Another weld at 23 defines the change in distributor metal from carbon steel to a high strength alloy. The portion of the distributor pipe inside the gasifier comprises the alloy. In order to achieve the desired and necessary high pressure drops for good distribution and fluidization of the bed, a plurality of relatively small orifice holes 26 on the order, for example of $\frac{1}{8}$ to $\frac{3}{4}$ inch diameter or even up to 2 to 3 inches for high gas rates are cast in the refractory lining. The holes have a uniform cylindrical shape extending from the innermost surface of the refractory for a distance of about $\frac{1}{2}$ to 6 inches (for large scale units) in the downstream or outlet direction and from that point tapering or diverging outwardly at 28 to a larger diameter in order reduce the velocity of the gas jets as it enters the bed. The portion 28 has a truncated conical configuration with the base at the outlet extremity. The nozzles are aligned axially and are disposed radially at an angle relative to the vertical plane passing through the distributor main axis (e.g. 15°-45°). A suitable length for the divergent nozzle portion is 4 to 8 times the nozzle outlet end diameter which may be in the range of from about $\frac{1}{2}$ to about 2 inches. As shown, the portion 28 commences its outward divergence within the confines defined by the inner periphery of the pipe 22. The thickness of the refractory at the nozzle outlet should preferably be on the order of ½ inch minimum. The gas discharge nozzles 30 are also lined similar to pipe 22 with the same erosion-resistant fiber reinforced castable refractory, which typically has a tabular alumina content 45 to 95 wt. %, particularly when they are compounded to produce refractory with cold compressive strengths in excess of 9,000 psi, and preferably in the range of 9,000 to 13,000 psi. A suitable mixture for the refractory is 4 to 10 pounds metal fibers, i.e. 0.010 to 0.016 inch diameter by ¾ inch by 1 inch long cold drawn alloy metal fibers in order to integrally reinforce the refractory and control any shrinkage during dry out and heat up. This type of shrinkage pattern which results from use of metal fibers, will maintain a uniform structure in the refractory so that the gas bypassing through the fine crack pattern will not create a problem. If the metal fiber reinforcements were omitted, the refractory will undergo shrinkage cracking in localized areas which will weaken the refractory and lead to failures and hot gas bypassing through the relatively large localized cracks. The refractory throughout should be sufficiently dense to withstand high pressure drops (e.g., 9 psi or more) without any failure. It also serves to insulate the pipe and the gas discharge nozzle metals from the high temperature gases so that the alloy shell pipes 22, 32 are cooled by submersion in the fluid bed which is at lower temperatures.

Figure 2:
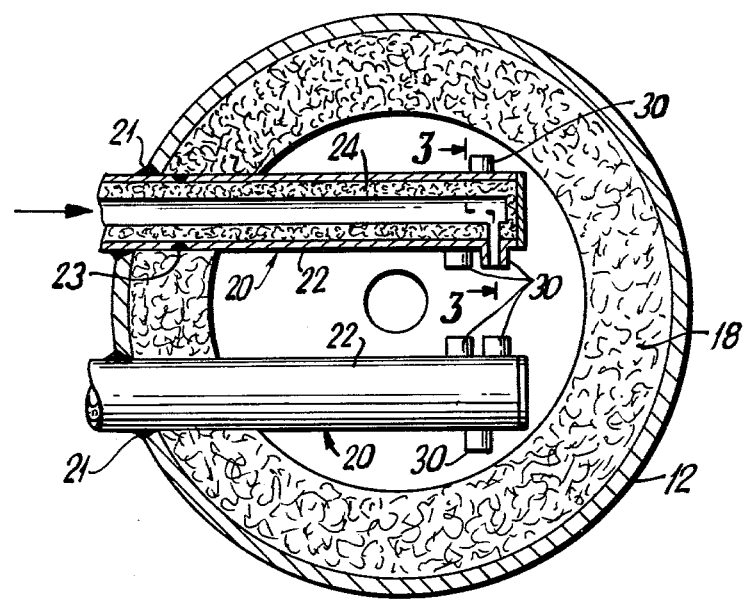
FIG. 2 illustrates an enlarged cross-sectional view of the gasifier of FIG. 1, showing the inlet gas distributors according to the present invention.
Figure 3:
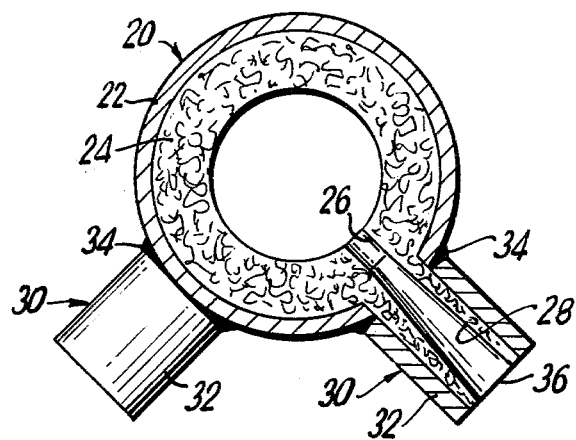
FIG. 3 illustrates an enlarged cross-sectional view taken substantially along the line 3—3 of FIG. 2, showing the cross-sections of the gas distributor and a gas discharge nozzle according to the present invention.

The gas discharge nozzles 30 are staggered on opposed sides along the underside portion of the pipe as shown in FIGS. 2 and 3 and each nozzle includes the particularly configured orifice holes or openings as described heretofore, in accordance with the invention. The nozzles are angularly disposed downwardly away from the fluid bed relative to the horizontal plane in order to achieve good gas distribution and also to reduce the possibility of any solids flowing back into the gas distributor pipes when the fluidizing gas flow ceases or is shut off. The discharge nozzle dimensions given above are exemplary and they can be designed for the particular process. Criteria useful in establishing the proper dimensional relationships are discussed below. As previously mentioned the entrance of the high temperature gases from the pipe interior is initially through the small cylindrical orifice hole 26 of fixed diameter in which a large portion of the pressure drop is taken. However, the length of the cylinder is sufficient such that the pressure drop due to the flow friction will be substantially the same as the pressure drop due to the entrance loss effect, that is, doubling the pressure drop through the cylindrically shaped orifice. The length of the divergent portion 28 is such as to provide for gradual expansion of the gas jet in order to obtain the desired pressure drop across the nozzle (between inlet and outlet). This results in a smooth flow pattern and prevents any currents from drawing particles from the bed into the nozzle tip and gradually eroding the adjacent nozzle refractory lining. Slight rounding of the edges of the lining at the inlet plane of the nozzle (at the inner periphery of the refractory) will reduce the drop somewhat, but will not cause any severe flow maldistribution as a result of significant pressure drop staging still being taken in the cylindrical portion 26 and the outlet to the bed 36. A suitable construction of the metal outlet nozzles may comprise pipe sections 32 welded as shown at 34 concentrically to preformed drilled holes in the distributor pipe. These holes correspond in diameter to that of the inside diameter of nozzle 32. The openings in the refractory lining can be formed with preshaped wood or plastic dowels at the time the lining is cast in order to obtain the orifice opening of the proper dimensions and configuration. The number of nozzles employed will vary depending upon the degree of gas distribution required.

As described heretofore, the distributor is immersed in the bed and directs hot gases into the bed which is cooler, via the nozzles. The gas fluidizes the bed and adds heat from the hot gas to the cooler solids in the bed. The solids, of course, are added and withdrawn at a rate sufficient to maintain the bed at the desired temperature. Because the bed consists of fluidized solids, it keeps the outer shell or surface of the distributor substantially at the bed temperature and not at the temperature of the hotter gas. This is accomplished because heat transfer from a hot gas to the distributor is poor, whereas there is good heat transfer between the distributor and solids material. This enables use of the metal distributor at temperatures where metals normally do not function as well due to the aforedescribed cooling effect of the fluid bed controlling the distributor temperature.

What is claimed is:

1. In a gasifier for use in high temperature processes, comprising an outer shell having a fluid bed of coal particles extending from the bottom thereof upward for a predetermined distance and a gas distributor immersed in said bed at said bottom, wherein the improvement comprises: said gas distributor comprising a pipe with an outer metal casing extending into said bed and lined internally with metal fiber reinforced refractory material for defining an interior hollow portion, a plurality of gas discharge nozzles with outer metal casings on the underside of said pipe comprising orifice openings, each of said orifice openings including an entrance opening directly adjacent said interior hollow portion of said pipe having a uniform diameter for a predetermined length, which extend from the interior hollow portion of said pipe through the pipe lining and terminate in an outlet for passage of gases from said distributor into said fluid bed, each of said orifice openings including refractory material along the inner surface thereof extending from said interior hollow portion to said outlet of said discharge nozzle and each of said nozzles including a continuously divergent hollow portion interior thereof extending from directly adjacent said entrance opening to said outlet.

2. The gasifier of claim 1 wherein said gas discharge nozzles are arranged in a pair of aligned rows with the nozzles in one of said rows being staggered with respect to the nozzles in the other of said rows.

3. The gasifier of claim 1 wherein said metal casing of each of said nozzles is of uniform diameter and said refractory material along the inner surface of said casing forms said divergent hollow portion.

* * * * *